United States Patent [19]
Brown et al.

[11] Patent Number: 5,656,057
[45] Date of Patent: Aug. 12, 1997

[54] METHOD FOR DRYING AND SINTERING AN OPTICAL FIBER PREFORM

[75] Inventors: Gillian L. Brown, Watertown, Mass.; Richard M. Fiacco, Corning, N.Y.; John C. Walker, Wilmington, N.C.

[73] Assignee: Corning Incorporated, Corning, N.Y.

[21] Appl. No.: 445,189

[22] Filed: May 19, 1995

[51] Int. Cl.$^6$ .............. C03B 37/012; C03B 37/018; C03B 37/07

[52] U.S. Cl. .................. 65/384; 65/416; 65/421; 65/422; 65/426; 65/427

[58] Field of Search .............. 65/384, 416, 421, 65/422, 427, 426

[56] References Cited

U.S. PATENT DOCUMENTS

| | | |
|---|---|---|
| 4,338,111 | 7/1982 | Edahiro et al. . |
| 4,693,738 | 9/1987 | Hoshikawa et al. . |
| 4,906,268 | 3/1990 | Lane et al. . |
| 5,022,904 | 6/1991 | Ishiguro et al. . |
| 5,055,121 | 10/1991 | Kanamori et al. . |
| 5,215,564 | 6/1993 | Weber . |
| 5,330,548 | 7/1994 | Danzuka et al. . |

FOREIGN PATENT DOCUMENTS

| | | | |
|---|---|---|---|
| 59-174538 | 10/1984 | Japan . | |
| 3-93641 | 4/1991 | Japan | ......... 65/427 |
| 5-24854 | 2/1993 | Japan | ......... 65/427 |

*Primary Examiner*—Melvin Mayes
*Attorney, Agent, or Firm*—William J. Simmons, Jr.

[57] ABSTRACT

The invention relates to a method of drying and sintering porous optical fiber preforms, especially those consisting of a solid glass core cane surrounded by a layer of cladding soot. After it is dried in a dehydrating atmosphere, the porous preform is heated to a presinter temperature just below that at which it would begin to rapidly densify. The various temperature holds and ramp rates are such that the preform is consolidated in a relatively short time without becoming cloudy or exhibiting other defects that would adversely affect the optical fiber drawn from the consolidated draw blank.

11 Claims, 3 Drawing Sheets

METHOD FOR DRYING AND SINTERING AN OPTICAL FIBER PREFORM

BACKGROUND OF THE INVENTION

1. Field of the Invention

This invention relates to a method for drying and sintering a porous optical fiber preform.

In the process of manufacturing optical fibers, preforms can be produced by various methods including outside vapor deposition (OVD) and vapor axial deposition (VAD). Porous preforms produced by both of these techniques are formed of glass soot or particles and must be dried and sintered. The drying step reduces the residual OH content of the preform, thereby reducing in the resultant optical fiber the absorption loss caused by OH groups in the vicinity of the 1300 nm operating wavelength. The step of sintering a preform produces a dense, substantially clear draw blank which is then drawn into the optical fiber. The combined steps of drying and sintering are referred to as consolidation. Two types of consolidation processes will be discussed herein, gradient consolidation and bulk consolidation. During gradient consolidation, one end of the preform sinters first, and the sintering then continues toward the other end of the preform. During bulk consolidation, the entire preform is heated to temperatures within the consolidation temperature range. If the preform is isothermally heated, the entire preform can be simultaneously sintered. In a variation of bulk consolidation, a given region of the preform remote from its ends is heated to a temperature that is higher than the remainder of the preform. The given region sinters first. This is advantageous in that it provides a path for outgassing from the region that is being sintered through the adjacent unsintered porous region and in that heat can transfer longitudinally through the preform from the sintered region to the adjacent porous region.

As the use of optical waveguide fiber has become more widespread, efforts have been directed toward producing fiber in larger quantities and at lower costs. The cost of optical fiber can be reduced by producing more fiber or fiber preforms per unit time from a given piece of equipment. The consolidation rate can be increased by increasing the size of the preform and/or by modifying the time-temperature schedule of the preform drying/sintering process.

2. The Prior Art

U.S. Pat. No. 4,906,268 (Lane et al.) discloses a scanning consolidation furnace that was designed for consolidating large porous glass preforms. The furnace comprises a cylindrical muffle made of silica, alumina, graphite or the like which defines a chamber in which the preform sits when it is lowered into the furnace. Surrounding the muffle is a graphite susceptor that is inductively heated during use by a coil which is capable of traversing the length of the susceptor. A microprocessor, which controls the furnace temperature profile, also controls the introduction of processing gases, e.g., nitrogen, helium, oxygen and chlorine, into the muffle chamber.

The scanning consolidation furnace of the Lane et al. patent can generate different temperature profiles along the longitudinal axis of the susceptor. A substantially isothermal profile can be generated by oscillating the coil over the total length of the furnace. By "substantially isothermal" is meant that the furnace temperature does not deviate more than some predetermined number of degrees along the entire length of the preform. The temperature deviation depends upon the particular process step that is being performed as well as the temperature at which the step is being performed.

A local hot zone can be generated in the Lane et al. furnace by causing the coil to remain at a given longitudinal position. The local hot zone can be moved along the furnace axis by traversing the coil along the furnace axis.

The prior art and the present invention will be discussed in connection with the consolidation of preforms formed by the following OVD process. A core cane is formed by depositing glass soot on a mandrel by a technique such as that disclosed in U.S. Pat. No. 4,486,212, which is incorporated herein by reference. The porous core preform can contain a layer of cladding glass soot, or it can comprise only core glass. The mandrel is removed, and the porous core preform is consolidated to form a core cane that is optionally stretched and severed into a plurality of pieces. A length of core cane is employed as a mandrel upon which cladding soot is deposited. The resultant "overclad" porous preform, which comprises a solid core surrounded by a porous cladding region, is dried and sintered.

Silica based soot preforms have characteristic densification curves. Defining that curve will aid in the understanding of the consolidation process described below in connection with both the Lane et al. patent and the present invention. If a porous preform is placed in a furnace having a gradient temperature profile, portions of the preform can sinter at different rates depending upon the temperature to which that portion is subjected. Key characteristics of the densification are as follows, reference being made to FIG. 1. When the preform is heated to temperatures in region A, referred to as the "Presintering Stage" of consolidation, little densification occurs, and the porous preform remains essentially sooty.

Rapid densification of the preform occurs when it is heated to temperatures in region B, which is referred to as the "Densification Stage" of consolidation. While preforms are subjected to temperatures in this region, they become essentially fully densified but appear completely opaque.

Region C is referred to as the "Clarification Stage" of consolidation. A preform that had been in the "Densification Stage" and which is opaque in appearance will become completely clear when heated to a temperature in region C.

No temperatures are given in FIG. 1 since the temperature ranges for regions A, B and C are dependent upon preform composition, preform diameter, initial density, mass, and the time during which the preform is subjected to the elevated temperature.

The Lane et al. patent discloses a ten phase process for consolidating porous optical fiber preforms, including idle, heat-up, hold and the like. However, the two main functions that are performed are "dry" and "scan/sinter". During the dry phase the furnace is maintained in a substantially isothermal condition at drying temperature so that OH ions and water can be removed from the entire length of the preform. Continual oscillation of the induction coil across the preform at a relatively constant speed is used to maintain the isothermal condition. In all of the phases prior to the sinter phases, the preform is heated to temperatures in Region A of FIG. 1, so that very little densification occurs. The dehydrating agents can therefore flow freely through the preform pores.

Following the dry phase, the coil moves to the bottom of the furnace where it enters the sinter phase during which time the furnace temperature is elevated to temperatures within Region C of FIG. 1. The furnace hot zone is traversed upwardly by slowly driving the coil upwardly along the preform. An isothermal furnace condition is not sought during the sinter phase; rather, the temperature of each individual element of the preform increases and decreases with the approach and passing of the coil, respectively. The coil position is held constant for a period of time before and after the up-drive to complete the sintering of the tip and the top portions of the preform, respectively. Preforms can be driven further into the furnace during top hold to assist sintering. During the sinter phase, the preform reaches 100% density and becomes fully clarified.

When a preform is consolidated by the process disclosed in the Lane et al. patent, outgassing can occur regardless of whether the outer surface of the preform consolidates before the interior portion of the preform. The outgassing can occur from the interior of the section which is being consolidated into the adjacent unconsolidated portion. If outgassing did not occur, trapped gas could form bubbles that could adversely affect subsequent prosessing steps such as fiber drawing.

The method disclosed in the Lane et al. patent, while producing high quality consolidated preforms, has proven to be time consuming. For example, an overclad porous preform weighing 10 kg would take approximately 6.1 hours to consolidate using this method. The sintering time cannot be reduced by merely scanning the coil along the preform at a faster rate. If the coil is scanned at too fast a rate, the preform may incompletely consolidate, thereby resulting in substantial losses of fiber due to processing problems during the subsequent fiber drawing operation. A second problem can occur; the drawn fiber can exhibit higher optical losses due to either incomplete consolidation or defect sites formed in the consolidated preform due to the increased consolidation rate.

Attempts to overcome these problems by increasing coil power and/or coil size can also produce detrimental results. There is some maximum temperature to which the equipment can be subjected. For example, a silica muffle sags rapidly at temperatures above about 1525° C.

Also, if the temperature of the preform is increased at too great a rate, cloudy areas referred to as "snowballs" are formed in the preform. It is believed that this is caused by an excessively non-uniform temperature distribution across the radius of the preform during the consolidation process. A non-uniform radial temperature profile establishes a condition in which the outer region of the preform becomes fully densified while the inner region adjacent the solid glass core cane remains in a relatively less densified state. The less densified region continues to contract but lacks the driving force to move the relatively high volume of completely densified glass radially inward. Therefore, the less consolidated material in the central region of the preform consolidates in upon itself and tears away from the cane. This leaves a void at the cane-soot interface.

A snowball can also occur during a bulk consolidation process if soot at the center of a preform has a higher density than soot at the outer region of the preform. It has been observed that porous preforms of lower overall bulk density are able to be successfully consolidated at lower temperatures and/or higher rates than preforms of higher density. It has been determined that specific surface area of the preform soot material increases significantly as bulk density decreases. Since reduction of surface area is the driving force for sintering, a lower density soot will have a significantly higher driving force than a high density soot. Thus, if a preform has a lower density soot at its outer region, the outer region will tend to consolidate prior to the inner region. This again results in a region of relatively unconsolidated soot surrounded by a completely consolidated glass, the inner soot lacking the driving force required to pull the consolidated portion inward.

A modification of the above-described Lane et al. process decreases the time required to consolidate a porous preform. The process is essentially the same as described above through the isothermal dry phase. After the "dry" phase has been completed, the furnace enters a second isothermal phase, the presinter phase, during which the coil continues to oscillate along the length of the muffle. By isothermally increasing the furnace temperature to just below the Region B temperature of FIG. 1, the entire preform is preheated and, ultimately, the time subsequently required at sintering temperatures is reduced. Presinter temperature can be in the range of about 1300° C.–1400° C., depending on the time during which the preform is held in this temperature range. The presinter temperature must be below that temperature at which rapid densification of the porous preform can occur.

Following the isothermal presinter phase, the furnace enters the "sinter" phase which is similar to the sinter phase in the one-pass sintering process disclosed in the Lane et al. patent. During the 'bottom hold" phase, the coil remains stationary and sinters the bottom tip of the preform, and the temperature at the bottom of the furnace reaches Range C of FIG. 1; any temperature within the range of 1450° C.–1520° C. is suitable for this phase. Next, during the "drive-up" phase, the coil moves upward at a rate which is as fast as possible without leaving any of the porous preform unclarified. The hot zone created by the coil progressively heats portions of chamber 22 above the sintering temperature of the preform. Because of the effectiveness of preheating the preform at a temperature above drying temperature but below sinter/clarification temperature, coil speeds greater than twice those used in one-pass sintering are possible. A porous preform weighing 10 kg would take approximately 4.75 hours to consolidate in the Lane et al. furnace using this modified method.

SUMMARY OF THE INVENTION

It is an object of the present invention to provide a method for consolidating porous optical fiber preforms at high production rates. Another object is to accomplish the high production rates without scanning the hot zone along the preform during the sintering phase.

In accordance with one aspect of the invention a porous preform is consolidated by initially subjecting it to a dehydrating agent at a temperature sufficient to reduce the OH content thereof. Thereafter the preform is presintered and sintered. During the presintering step, the temperature of the preform is increased to a presinter temperature that is lower than that temperature which would cause the preform to rapidly densify. During the sintering step, the preform is heated to a temperature which is sufficient to cause it to densify. During the steps of presintering and sintering, the temperature profile along the length of the preform is such that the temperature at a region remote from the ends of the preform is higher than the temperature at the preform ends. The temperature deviation between the maximum and minimum temperatures to which the preform is subjected during presintering is greater than the temperature deviation between the maximum and minimum temperatures to which the preform is subjected during sintering In accordance with yet another aspect of the invention a porous preform is consolidated by initially subjecting it to a dehydrating agent at a temperature sufficient reduce the OH content thereof. Thereafter the preform is presintered and sintered. After the preform is presintered, its temperature is ramped to a temperature which is sufficient to cause it to densify, the step of ramping being performed in at least first and second ramp rates of temperature increase. The second ramp rate is at least 1.5 times the first rate.

DETAILED DESCRIPTION

The method of the present invention was developed to provide an increase in the rate of consolidation of porous glass preforms without affecting the quality of the resultant sintered draw blank or the optical fiber drawn therefrom. This method is an improvement over the method disclosed in the Lane et al. patent and the modification of the Lane et al. patent, both of which are discussed above under the heading, "Prior Art".

According to one aspect of the present invention, the consolidation process includes, in addition to an isothermal drying phase, the phases of heating the entire length of the preform to a temperature sufficient to presinter the preform without rapidly increasing its density and thereafter heating the entire length of the preform to a sintering temperature sufficient to densify and clarify the preform. During both the presinter phase and the sinter phase the preform is subjected to a "wedge" temperature profile, i.e. the longitudinal temperature profile is such that the temperature at a point or region remote from the ends of the preform is higher than the temperature at the preform ends. The longitudinal temperature differential $T_{DP}$ between the highest and lowest temperatures of the wedge profile during presinter phase is less than 150° C., and the longitudinal temperature differential $T_{DS}$ of the wedge profile during sinter phase is less than the temperature differential of the wedge profile during presinter phase. The longitudinal temperature differential $T_{DS}$ is preferably less than 75° C.

According to another aspect of the invention, the radial temperature distribution across the preform is substantially uniform prior to the sinter phase. This is achieved by controlling the rate of increase of the temperature of the preform and/or by holding the preform temperature at presinter temperature for a sufficient period of time prior to ramping to sinter temperature.

Yet another aspect concerns the final sinter phase. By splitting this phase into two time periods, the total time for the sinter phase can be decreased. The first rate of ramping the temperature during the first time interval of the sinter phase is sufficiently low that snowballs do not form. At the end of the first time period the density of the porous preform is greater than 90% theoretical density. The rate of temperature increase during the remainder of the sinter phase can be about 1.5 to five times the first rate, and yet no detrimental results occur.

Figure 2:
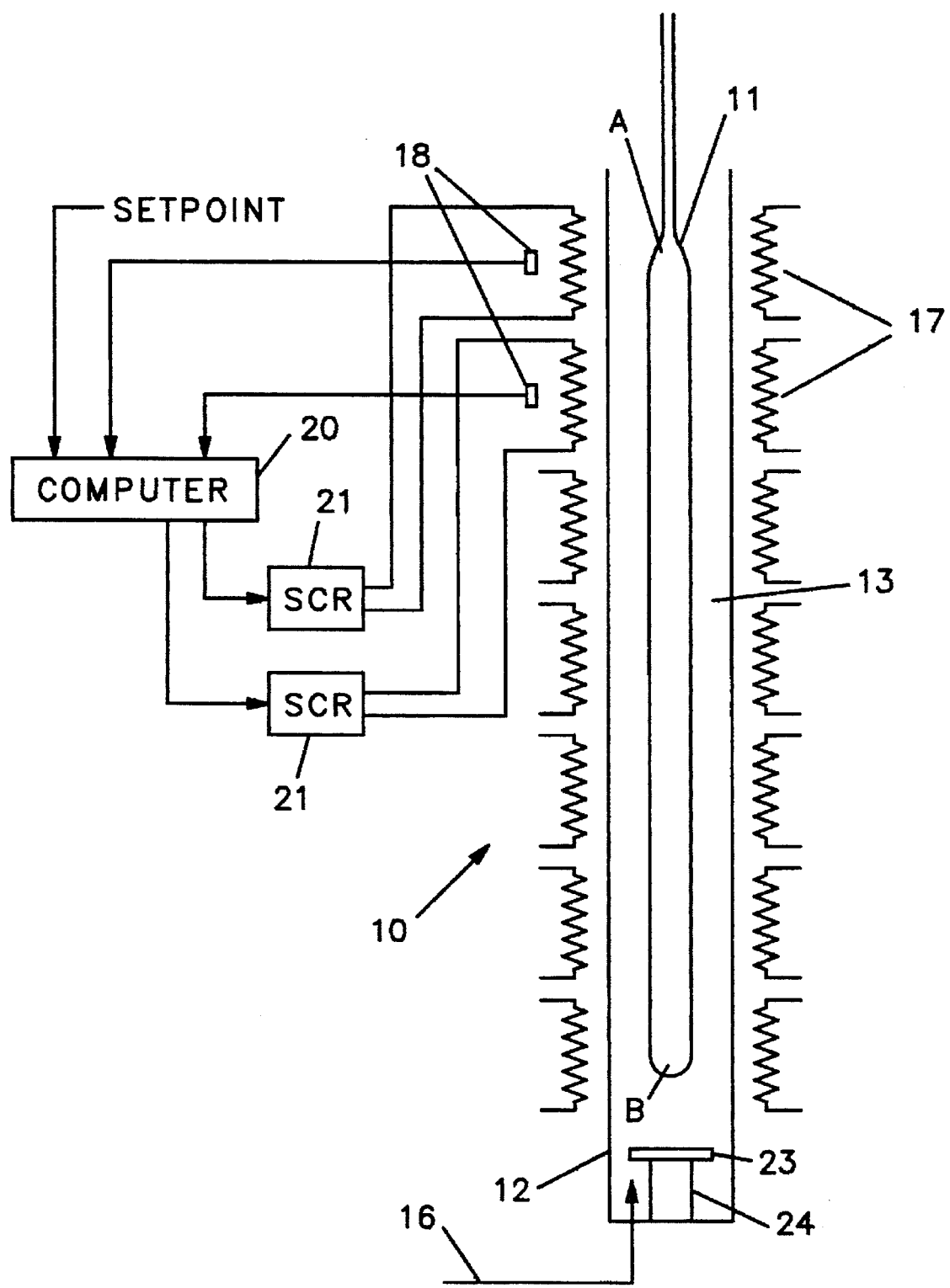
FIG. 2 is schmetic illustration of a consolidation furnace suitable for performing the method of the invention.

A furnace 10 suitable for performing the method of the present invention is shown in FIG. 2. When lowered into furnace 10, preform 11 is situated in chamber 13 defined by cylindrically-shaped silica muffle 12. Process gasses are supplied to the furnace through piping 16. The processing gases are supplied to chamber 13 at a pressure and flow rate sufficient to maintain the chamber at a pressure above atmospheric pressure. Blank downfeed can be provided using a typical consolidation downfeed tower assembly (not shown) controlled by computer. Heat is provided to the furnace from a plurality of zones of resistance heating elements 17 that are stacked vertically. Surrounding the muffle and heating elements is insulation material (not shown) which can consist of high purity fibrous alumina insulation material.

Muffle 12 is supported at its top and bottom ends by upper and lower support plates, respectively (not shown). The following techniques were employed to lower the temperature of these plates. The upper muffle support plate was provided with an aluminum top ring having an integral cooling channel into which cooling water was piped. A sandblasted quartz disk 23 was placed at the top of a silica tube 24 which was placed into the bottom of furnace 10. Disk 23 shielded the bottom plate and its O-ring from radiation by blocking and/or scattering the radiation. The O-ring was made of high temperature material.

Each resistance heating zone is independently controlled by the remote computer system 20 using thermocouples 18 placed between the outside muffle wall and the insulation. The computer controls the silicon controlled rectifiers (SCR) 21 which supply current to the heating elements. The user configurable control system allows for infinite permutations of temperature ramps and holds. The multiple heating zones enable accurate temperature control and a high degree of flexibility in terms of temperature profiles and ramping schemes.

The internal temperature of the furnace is mapped for different temperature profiles by inserting a thermocouple into the furnace in the place of a porous preform. The temperature of each zone of the furnace is varied in a predetermined manner and the temperatures at different axial locations in the furnace is recorded. Accurate control of the internal temperature is thereafter achieved by using the desired internal temperature as the control loop setpoint combined with a calculated internal temperature as the feedback. The temperature of the control thermocouple 18 is input to the remote computer 20 and run through a linear equation to convert it to an estimated internal temperature. The slope and intercept parameters are determined from the historical internal temperature mapping. Each zone has a unique set of parameters which have been shown to be stable over a period of 6 months as long as the internal components of the consolidation environment are not changed (i.e., radiation shielding, etc.). The output of the calculation (termed the derived temperature) goes into the proportional, integral, derivative (PID) loop calculation along with the desired internal temperature as the setpoint. The PID loop then outputs a desired power level to the SCR which regulates power to a particular zone of heating elements 17.

During the consolidation process, the preform is loaded into the furnace and is sequentially subjected to three consolidation phases referred to as the dry, presinter and sinter phases. During each phase, the temperature profile of the furnace is adjusted so that each portion of the preform is subjected to the proper temperature.

Throughout the dry phase, helium and chlorine are flowed into chamber 13. The rate of drying is determined by the combined effects of the temperature at which the drying is performed and the composition (i.e., dehydrating agents) of the atmosphere to which the preform is exposed. Higher concentrations of dehydrating agents generally result in more complete drying. Drying temperatures in the range of about 900°–1300° C. have been found to be effective, with temperatures of about 1100°–1250° C. being preferred because such temperatures more vigorously promote the activity of the dehydrating agent(s) while minimizing interparticle growth within the preform. Interparticle growth decreases porosity and thus hinders the drying process.

Figure 3:
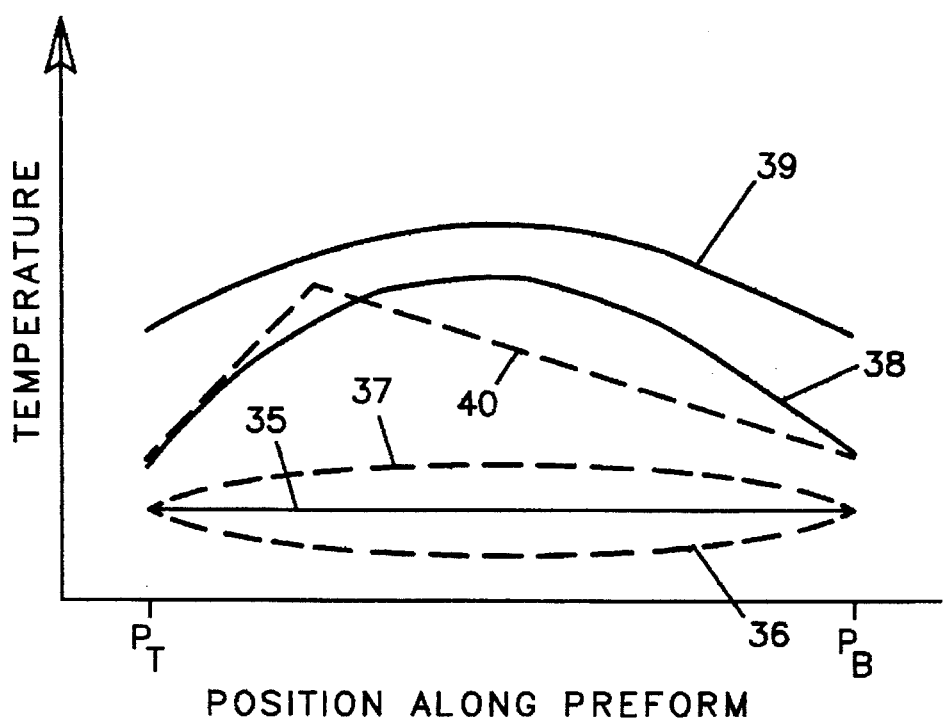
FIG. 3 is a graph illustrating the temperature of the furnace relative to the position along the preform for various phases of the consolidation process.

The furnace is preferably maintained at drying temperature at the time that the preform is loaded into it. However, furnace temperature could be lower than drying temperature at the time that the preform is loaded, and the temperature could thereafter be ramped to drying temperature. Furnace profiles for the consolidation process are illustrated in FIG. 3. Position $P_T$ and $P_B$ are the positions of the top and bottom ends, respectively, of the preform in the furnace.

The dry phase of the present consolidation process is conducted in accordance with known principles. Preferred techniques are described herein. During at least the initial portion of the dry phase, the preform is preferably subjected to an isothermal profile (line 35) so that the entire preform can be heated to the maximum possible temperature for achieving rapid drying, no portion of the preform being subjected to such a high temperature that shrinkage and consequent loss of porosity occurs.

Whereas line 35 illustrates a precisely isothermal furnace temperature profile, the profile could also be substantially isothermal, whereby the drying temperature differential $T_{DD}$ between the highest and lowest drying temperatures of the furnace profile is less than about 10° C., for example. Two of the many possible substantially isothermal drying temperature profiles are illustrated by dashed lines 36 and 37 of FIG. 3.

The furnace temperature can be held constant at the load temperature for a period of up to about 45 minutes during the "dry" phase, or it can immediately begin to ramp to the presinter temperature. The process of slowly heating the entire porous preform during the later described ramp-up to presinter phase allows some drying to occur, thereby minimizing the time requirements for drying at lower temperatures. If the porous preform is held at a constant drying temperature for a time sufficient to adequately dry the preform, the dehydrating atmosphere can be turned off after the dry phase. Alternatively, the dehydrating atmosphere can continue to flow during ramp-up to presinter phase, during presinter phase or even during sinter phase.

The rate of temperature increase from the load temperature to the presinter temperature can be up to about 10° C. per minute. If the ramp-up rate is too great, the outer region of the preform will consolidate before the inner region, and cloudy regions or snowballs will be formed. Such a preform cannot thereafter be made uniformly clear during the consolidation process. If the temperature during dry phase has been held constant for a relatively long time, then the ramp to presinter temperature could be about 10° C. per minute. However, if the temperature is immediately ramped from dry temperature to presinter temperature, a slower ramp, should be employed; ramps as high as 2° C. per minute have been used.

After the furnace temperature reaches presinter temperature, i.e. between about 1300° C. and 1396° C., temperature is held constant for a period of between about 20 to 90 minutes. The time during which the preform is held at presinter temperature is sufficient to achieve a substantially uniform radial temperature gradient, i.e. to allow the radial temperature gradient within the preform decrease to less than 10° C. This ensures that the preform is uniformly sintered in a subsequent consolidation step. The radial temperature gradient of the preform can be predicted by computer modeling, taking into consideration such factors as the furnace temperature, the thermal history of the preform, and the composition and density of the porous preform. The model employed is a one dimensional, transient radial heat conduction calculation that is performed iteratively via the computer.

Temperatures given for the dry, presinter and sinter phases refer to the maximum temperature of the furnace temperature profile, since the profile for these phases is intentionally non-flat or wedge-shaped, whereby the temperature at some region remote from the preform ends (referred to as the "off-end region") is higher than the temperature at both ends of the preform. Presinter temperature profile 38 of FIG. 3 experiences a maximum temperature near the center of the preform. Dashed line 40 indicates that the maximum temperature can occur at a region of the preform that is between the center and one of the preform ends.

Figure 1:
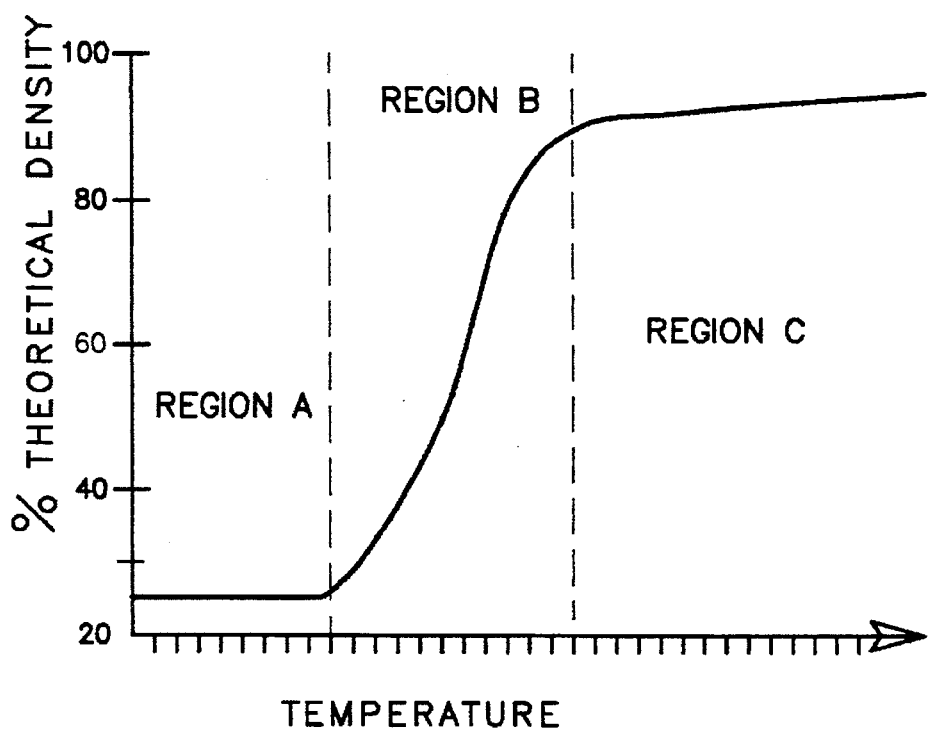
FIG. 1 is a densification curve for a silica-based porous preform.

The furnace temperature is then ramped to sinter temperature. While a high silica content preform is being heated in a consolidation furnace, very little densification occurs up to about 1360° C., and rapid densification occurs in the range between 1360° C. and 1400° C. At these latter temperatures the preform becomes essentially completely shrunk, but is totally opaque and is comprised of completely closed porosity. At temperatures greater than 1400° C. the pores close and the blank clarifies. This type of densification behavior is illustrated in FIG. 1.

The rate of the temperature ramp to sinter temperature cannot be too great or the resultant blank will contain trapped cloudy regions or snowballs. During one study of this temperature ramp, three 20 kg porous preforms having pure silica overclad soot (preforms A, B and C) were subjected to the same preliminary consolidation phases, i.e. they were dried and then subjected to a presinter phase at 1350° C. Preform A was ramped from 1350° C. to 1450° C. at a rate of 0.5° C. per minute; the resultant draw blank appeared cloudy. Preform B, which was ramped from 1350° C. to 1450° C. at a rate of 0.2° C. per minute, appeared clear. Obviously, the slower ramp-up rate requires more time. However, it was found that after the furnace temperature had been ramped through the range of 1350° C. –1400° C. range B of rapid densification of the curve of FIG. 1, the remainder of the ramp-up to sinter temperature could be performed at a rate that is about two to five times faster than the slower ramp. This "split ramp" to sinter temperature was demonstrated by ramping Preform C from 1350° C. to 1400° C. at a rate of 0.2° C. per minute and then ramping from 1400° C. to 1450° C. at a rate of 0.5° C. per minute; the resultant draw blank appeared clear. The change in ramp rate can occur after the density of the porous preform has increased to a value greater than 90% theoretical density.

Therefore, the porous preform is preferably subjected to a split ramp consolidation cycle in which the sinter ramp is slower in the region of rapid densification and faster in the temperature range in which clarification occurs. The slower ramp (during rapid densification) is determined by the diameter of the porous preform. For example, the first stage of the sinter ramp can be in the range of about 0.1° to 0.4° C. per minute for porous preform having an outside diameter of 220 mm. For a porous preform having an outside diameter of 110 mm, the first stage of the sinter ramp can be in the range of about 0.3° to 0.8° C. per minute. It has been found that the preform can be completely sintered and clarified by holding the furnace at sinter temperature for a period of time between zero and 15 minutes.

The sinter temperature profile of the furnace is illustrated by curve 39 of FIG. 3. It is noted that the longitudinal temperature differential $T_{DS}$ of the wedge profile during sinter phase is less than the temperature differential $T_{DP}$ of the wedge profile during presinter phase. The maximum temperature of the sinter profile can be at the center as shown, or it can be between the center and one of the preform ends. A consolidation process utilizing wedge-type temperature profiles was found to have advantages over an essentially flat profile consolidation process in terms of consolidation rate potential. The mechanism responsible for this involves the transfer of heat into the blank. If a porous preform were truly heated uniformly over its entire length, the direction of heat transfer would be completely radial (in a direction toward the center of the preform). Since there would be no temperature difference axially along the blank, no heat transfer would occur axially. As discussed previously, the limiting factor in consolidating a preform to full clarity is the necessity to minimize radial temperature gradients in the preform so as to prevent the outer region from sintering prior to the inner region.

A consolidation process utilizing wedge-type temperature profiles tends to decrease the radial temperature gradient. When a wedge-type longitudinal temperature profile is employed, an off-end portion of the preform is heated to a higher temperature than the ends, thereby creating a portion of relatively densified glass in the off-end region of the preform. Heat transfer occurs radially due to the radial temperature gradient that is established by applying heat to the outer surface of the preform. However, in this case heat is also transferred axially since there is a temperature gradient in the axial direction. Essentially, heat is being applied through the consolidated off-end region of the preform to the entire cross-section of the unconsolidated portion of the preform. In this way, the temperature difference between the inside and outside of a given radial position is less than what it would have been if heat were only being applied in the radial mode. Since this process decreases the radial temperature gradient across the unconsolidated parts of the preform, the ramp rates can be significantly increased. For example, when a 30 kg preform was subjected to a consolidation process wherein the longitudinal temperature profile was substantially uniform, a sinter ramp rate of 0.12° C. per minute was required. However, when the same size preform was subjected to a consolidation process wherein wedge-type longitudinal temperature profile was utilized, a ramp rate of 0.27° to 0.32° C./min was possible.

The following example is illustrative of the present invention. A soot preform was made using standard OVD deposition techniques as described in U.S. Pat. No. 4,486,212. This soot preform was dried and consolidated in a conventional manner. The preform was then drawn into glass canes. An overclad soot preform was then made using a glass cane as a starting member and using standard OVD deposition techniques. The resultant overclad porous preform weighed 30 kg and had a radius of 220 mm.

Figure 4:
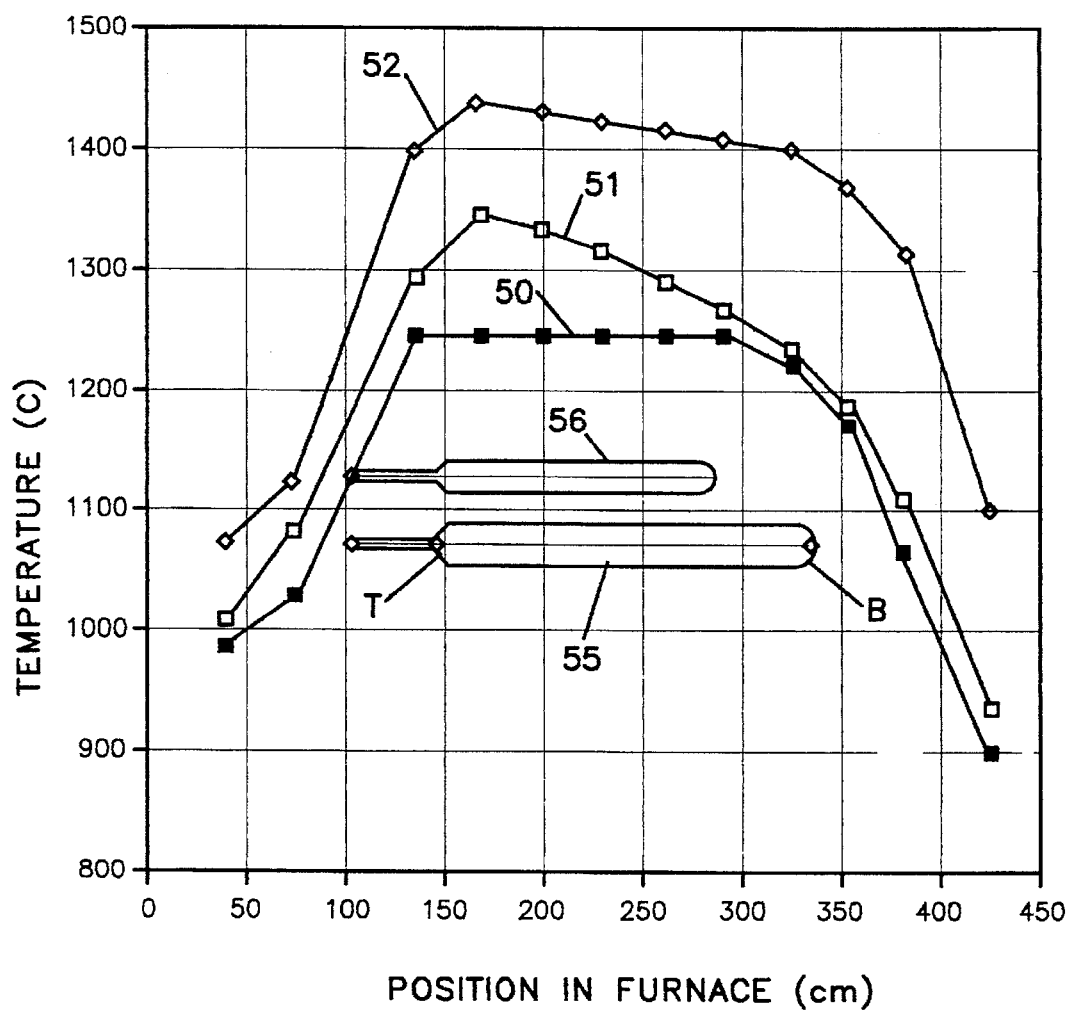
FIG. 4 is a graph which shows the longitudinal furnace profiles for the dry, presinter and sinter phases of consolidation during an actual run.

The overclad preform was then dried and consolidated using the method of the present invention. The porous preform was loaded into a furnace of the type described in conjunction with FIG. 2. The furnace profile at the time of loading is represented by curve 50 of FIG. 4. When the preform was being loaded, 0.65 slpm $Cl_2$ and 65 slpm He flowed upwardly through the furnace muffle. These flow rates were maintained throughout the consolidation process. The positions of the porous soot preform and the resultant consolidated blank relative to the furnace profiles are shown at 55 and 56, respectively. Curve 50 shows the longitudinal temperature profile to which the preform was subjected when it was loaded into the furnace. The maximum temperature is about 1250° C.

After the preform was loaded, the maximum furnace temperature was immediately ramped to presinter temperature at a rate of 5° C. per minute. Curve 51 illustrates the furnace profile at presinter temperature. The maximum temperature is 1350° C., and the temperature deviation $T_{DP}$ between the maximum and minimum presinter temperatures to which the preform was subjected is about 130° C. The furnace was maintained at presinter temperature for 90 minutes.

The maximum temperature was ramped to 1400° C. at a rate of 0.15° C. per minute, and it was then ramped to sintering temperature of 1450° C. at a rate of 0.30° C. per minute. Curve 52 illustrates the furnace profile at sinter temperature. The temperature deviation $T_{DS}$ between the maximum and minimum sinter temperatures to which the preform was subjected during the sinter phase was about 60° C. The preform was held at sinter temperature for 15 minutes. The furnace temperature was then decreased to 1250° C. so that the consolidated draw blank could be removed.

A 30 kg porous preform can be consolidated by this method in 8–10 hours. A direct comparison cannot be made between this method and that of the furnaces described in the prior art section above since the furnace of this example was optimized for 30 kg preforms. If the furnace of this example was optimized for 30 kg preforms, it is expected that a 10 kg preform could be consolidated in 3.5 to 4.0 hours, an improvement over the methods described in the prior art section above.

The resulting preform produced using the method of the present invention was considerably shorter than preforms produced by prior methods. In this example a 235 cm long porous preform consolidated to a length of about 185 cm. A similar porous preform consolidated to a length of about 210 cm when the above-described Lane et al. and modified Lane et al. methods were used. Reducing the length of the consolidated preform provides benefits in the fiber drawing operation because of easier handling of the consolidated preforms, even if the preform is larger in diameter when consolidated using the method of the present invention.

No visual defects such as bubbles could be seen in the resultant consolidated draw blank which was then drawn into optical fiber which was suitable for commercial use.

Although specific embodiments of the invention have been described and illustrated, it is to be understood that modifications can be made without departing from the spirit and scope of the invention. For example, preforms other than the described overclad porous preform can be consolidated in accordance with the method of the present invention. The preform need not have a solid glass core cane along its axis. Rather, VAD-produced preforms consisting entirely of soot could be employed.

We claim:

1. A method for drying and sintering a porous glass optical waveguide preform, comprising the steps of:
   (a) drying said preform by subjecting it to a dehydrating agent at a temperature sufficient to reduce the OH ion content thereof,
   (b) presintering said preform by increasing the temperature thereof to a presinter temperature that is lower than that temperature which would cause said preform to rapidly densify, and thereafter (c) ramping the temperature of said preform to a temperature which is sufficient to cause it to densify, the step of ramping being performed in at least first and second ramp rates of temperature increase, said second ramp rate being at least 1.5 times said first rate.

2. The method of claim 1 wherein said second ramp rate is no greater than 5 times said first ramp rate.

3. The method of claim 1 wherein said first ramp rate is between 0.1° and 0.8° C. per minute.

4. The method of claim 1 wherein said preform comprises a solid glass core cane surrounded by cladding glass particles, and wherein said first ramp rate is sufficiently low that the inner region of said glass particles does not consolidate prior to the outer region of said particles and tear from said solid glass core cane when said outer region of glass particles consolidates, said first rate of increase continuing until the density of said preform has increased to at least 90% of theoretical density.

5. A method for drying and sintering a porous glass optical waveguide preform, comprising the steps of:

(a) drying said preform by subjecting it to a dehydrating agent at a temperature sufficient to reduce the OH ion content thereof, (b) presintering said preform by increasing the temperature thereof to a presinter temperature that is lower than that temperature which would cause said preform to rapidly densify, and (c) sintering said preform by heating it to a temperature which is sufficient to cause it to densify, wherein, during the steps of presintering and sintering, the temperature profile along the length of the preform is such that the temperature at a region remote from the ends of the preform is higher than the temperature at the preform ends, wherein the step of sintering comprises ramping the temperature of said preform to sintering temperature in at least first and second ramp rates, said second ramp rate being from 1.5 to 5 times said first ramp rate.

6. The method of claim 5 wherein said first ramp rate is between 0.1° and 0.8° C. per minute.

7. A method for drying and sintering a porous glass optical waveguide preform including a solid glass core cane surrounded by cladding glass particles, said method comprising the steps of:

(a) drying said preform by subjecting it to a dehydrating agent at a temperature sufficient to reduce the OH ion content thereof, (b) presintering said preform by increasing the temperature thereof to a presinter temperature that is lower than that temperature which would cause said preform to rapidly densify, and (c) sintering said preform by heating it to a temperature which is sufficient to cause it to densify, wherein, during the steps of presintering and sintering, the temperature profile along the length of the preform is such that the temperature at a region remote from the ends of the preform is higher than the temperature at the preform ends, wherein said method is characterized in that, after the step of presintering, said method comprises the step of increasing the temperature of said preform at a first rate of increase that is sufficiently low that the inner region of said glass particles does not consolidate prior to the outer region of said particles and tear from said solid glass core cane when said outer region of glass particles consolidates, said first rate of increase continuing until the density of said preform has increased to at least 90% of theoretical density, the temperature of said preform thereafter increasing at a second rate that is greater than said first rate.

8. The method of claim 7 wherein said second rate of temperature increase is at least 1.5 times said first rate of temperature increase.

9. A method for drying and sintering a porous glass optical waveguide preform, comprising the steps of:

(a) drying said preform by subjecting it to a dehydrating agent at a temperature sufficient to reduce the OH ion content thereof, (b) presintering said preform by increasing the temperature thereof to a presinter temperature that is lower than that temperature which would cause said preform to rapidly densify; and (c) sintering said preform by heating it to a temperature which is sufficient to cause it to densify, wherein during the steps of presintering and sintering the temperature profile along the length of the preform is such that the temperature at a region remote from the ends of the preform is higher than the temperature at the preform ends, and wherein there is a temperature deviation $T_{DP}$ between the maximum and minimum temperatures to which the preform is subjected during the step of presintering, and a temperature deviation $T_{DS}$ between the maximum and minimum temperatures to which the preform is subjected during the step of sintering, $T_{DP}$ being greater than $T_{DS}$, wherein the maximum temperature is at the region remote from the ends of the preform.

10. The method of claim 9 wherein $T_{DP}$ is less than 150° C.

11. The method of claim 9 wherein $T_{DS}$ is less than 75° C.

* * * * *